United States Patent Office 2,876,156
Patented Mar. 3, 1959

2,876,156

INSECTICIDES—DERIVATIVES OF ITACONIC ACID

Abraham Bavley, Brooklyn, Karl J. Brunings, Malba, and Donald P. Cameron, Bronx, N. Y., assignors to Chas. Pfizer & Co., Inc., New York, N. Y., a corporation of Delaware No Drawing. Application May 3, 1956
Serial No. 582,347

11 Claims. (Cl. 167—22)

This invention is concerned with a new class of pesticides valuable in combating insects and particularly useful as acaricidal agents (miticidal agents).

The wide-spread and effective use of insecticides has given rise to a new problem, that is, the control of mites. The removal of insects particularly to insects which are the natural enemies of mites has progressed to the point where various species of mites formerly considered serious pests only occasionally, or in restricted areas, have caused grave injury each season to many economically important crops. The compounds of this invention are unusually effective in the control of mites. These compounds are dithiophosphoric acid, diester derivatives of 1,2-dicarbalkoxy-propene-2, more commonly known as itaconic acid. Also included within the purview of this invention are certain compounds wherein the dicarbalkoxy functional groups of itaconic acid are modified so as to obtain monoesters, diesters, monoamides, diamides, imides, anhydrides and metallic salts.

The diesters, monoesters, monoamides, diamides, imides and anhydrides are readily prepared by the reaction of a dithiophosphoric acid diester with the corresponding itaconic acid derivatives. The acid themselves and the metallic salts of the acids are best prepared by reacting a dithiophosphoric acid diester with itaconic anhydride and hydrolyzing the resulting compound with dilute acid or dilute base respectively.

The scope of this invention with reference to the acids, monoamides, diamides, imides, anhydrides and metallic salts is readily apparent to one skilled in the art. To define more fully the diesters of this invention, the following formula is presented:

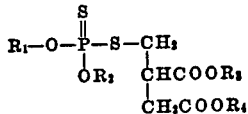

wherein $R_1$, $R_2$, $R_3$ and $R_4$ are alkyl, aryl or aralkyl groups containing up to ten carbon atoms.

These esters would be named as 1,2-dicarbalkoxy-3-[S-(O,O-dialkyl)]-propane dithiophosphate.

It should be pointed out that $R_1$ and $R_2$ as described in connection with the above formula would be identically described with reference to the monoesters, monoamides, diamides, imides, anhydrides and metallic salts of itaconic acid as well as itaconic acid itself. In the case of the monoesters either one of $R_3$ or $R_4$ is a hydrogen atom and the other is an alkyl, aryl or aralkyl group as described above.

With the monoamides, diamides and imides of this invention the hydrogen and/or hydrogens attached to the nitrogen and/or nitrogen atoms may be replaced with alkyl, aryl or aralkyl groups containing up to ten carbon atoms.

Although all of the compounds within the scope of the above disclosure are active pesticidal agents, we prefer to use those compounds wherein $R_1$, $R_2$, $R_3$ and $R_4$ are alkyl groups containing from one to four carbon atoms. We prefer these compounds primarily because they appear to have a much higher order of miticidal activity than the other compounds of the invention. Furthermore, the starting products from which they are prepared are readily available thus making our product economically feasible.

The preferred compounds of this invention are prepared by reacting a dialkyl dithiophosphoric acid diester wherein the alkyl groups contain from one to four carbon atoms with a 1,2-dicarbalkoxy-propene-2 wherein the alkoxy groups contain from one to four carbon atoms in accordance with the formula shown below:

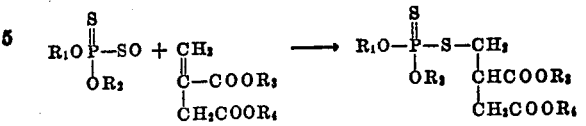

The conditions under which this reaction is carried out vary considerably with the reactivity of the reactants and with their physical state. Most of the reactants are liquids and although a solvent may be used, we have found it advantageous to simply mix the two liquids and to allow the mixture to stand at room temperature, that is, from about 20° C. to 25° C. until the reaction is complete. This usually takes about forty-eight hours.

Although it is convenient to carry out the reaction at room temperature certain of the less active reagents will require heat. Occasionally temperatures as high as 150° will be employed. Of course, even with those reactants which will react at room temperature heat may be applied if it is desired to speed up the reaction. As might be expected, the higher the temperature the more rapidly the reaction will take place. Some of the reactions will go essentially to completion in as short a time as one-half hour at the higher temperatures.

With those reactants which are solids and, if it is desired, with those reactants which are liquids, a solvent may be used. Such solvents include the low molecular weight, aliphatic alcohols such as methanol, ethanol, glycol, glycerol and the like; low molecular weight ketones such as acetone, methylethyl ketone, methylisobutyl ketone, acetophenone, cyclohexanone and the like; aliphatic esters such as ethyl acetate, methyl propionate and the like; trialkylphosphates such as triethylphosphates and triisopropylphosphate; ethers such as ethyl ethers, butyl ether and dioxane; aromatic hydrocarbon solvents such as benzene, toluene, xylene and the like; nitro aromatic hydrocarbons such as nitrobenzene; halogenated hydrocarbon solvents such as chlorobenzene, chloroform and carbon tetrachloride; and dimethyl form amide.

To summarize, the reaction between a dialkyl dithiophosphoric acid diester and a 1,2-dicarbalkoxy-propene-2 may take place either with or without a solvent at a temperature of between 20° C. and 150° C. during a period ranging from one-half hour to forty-eight hours.

There are certain other conditions which will generally be found to aid the reaction. For example, the reaction may be accelerated by the use of a catalyst. We prefer to use a nitrogenous base such as pyridine, dimethylaniline, trimethylamine, triethylamine or other obvious equivalents. The amount of catalysts employed is usually within the range of from 0.1% to 2.5% based on the total weight of the reactants.

Because of the tendency of itaconic acid to polymerize, we have found that the reaction is most advantageously carried out in a dark flask in the presence of a polymerization inhibitor such as hydroquinone.

As an example of the particular effectiveness of our compounds against mites, their miticidal action against

*Tetranychus bimaculata* commonly known as the two-spotted spider mite may be cited. This particular mite causes extensive damage in both hot house and open air crops. It is a general feeder but is particularly troublesome with such crops as cucumbers, tomatoes, roses, chrysanthemums, fuchsias and ageratums. It is a major problem on roses. When it is not controlled it limits production of edible crops and makes flowers unsalable. It has become increasingly prevalent in orchards and particularly in those areas which have been extensively treated with common insecticides.

We have utilized the agents of this invention in standard miticidal tests against the two-spotted spider mite. We have found that when one of the compounds of our invention, namely, 1,2 - dicarbomethoxy - 3 - [S - (O,O-diethyl)]-propane dithiophosphate is used in an aqueous emulsion containing the active compound in a concentration as low as ten parts per million by weight, the percentage of kills obtained is seventy-two percent. When the concentration is increased to twenty parts per million, the percentage of kills is increased to ninety percent. When a compound such as 1,2-di-n-carbobutoxy-3-[S-(O,O-diethyl)]-propane dithiophosphate; 1,2-di-n-carbobutoxy - 3 - [S - (O,O - di - n - propyl)] - propane dithiophosphate or 1,2-dicarbomethoxy-3-[S-(O,O-dimethyl)]-propane dithiophosphate is utilized in a concentration of twenty parts per million in an aqueous emulsion, the percentage of kills is ninety-five percent. The compound, 1,2-dicarbomethoxy-3-[S-(O,O-di-n-propyl)]-propane dithiophosphate is ninety-eight percent effective against the two-spotted spider mite under the same conditions.

Mites present a peculiar control problem. Their life cycle is so short that there is nearly always a sufficiently high proportion of the population in the egg stage to render miticides which are effective only against the nymph or adult stage of the mite ineffective. Thus, a miticide which is effective only against the nymph and adult mite does not give complete control since the eggs which have not yet hatched might very well hatch and mature after the miticide has disappeared from the plant. It is a particular attribute of our invention that the compounds are effective against all stages of the mite life cycle including the egg.

In a test employing the two-spotted spider mite in which plants were sprayed with an aqueous emulsion containing twenty parts per million of 1,2-dicarbomethoxy-3-[S-(O,O-dimethyl)]-propane dithiophosphate, a count was made of the number of mites per leaf seven days after the initial spraying. It was found that the average number of mites per leaf was under two. Since under the conditions of the test the eggs would normally have hatched within the seven day period and since each female mite lays a total of from one hundred to one hundred and ninety-four eggs during its life, it is obvious that this compound is effective in destroying the eggs. Similar results were obtained with other compounds of our invention.

Although the active agents of this invention can be used alone, it is more economical to use them in a dispersed form in a suitable extending agent.

In this disclosure and in the claims appended thereto, we use the term, "dispersed" in its widest possible sense. When we say that the compounds of this invention are dispersed we mean that the particles may be molecular in size and held in true solution in a suitable solvent. We mean further that the particles may be colloidal in size and dispersed through a liquid phase in the form of suspensions or emulsions or in the form of particles held in suspension by wetting agents. We also include particles which are dispersed in a semi-solid viscous carrier such as Vaseline or soap in which case they may be actually dissolved in the carrier or held in suspension in the carrier with the aid of suitable emulsifying or wetting agents. By the term, "dispersed" we also mean that the particles may be mixed with and spread throughout a solid carrier so that the mixture is in the form of powder or a dust. We also include in the term, "dispersed," mixtures which are suitable for use as aerosols such as a solution, suspension or emulsion of the agents of our invention in a carrier such as Freon which boils below room temperature at ordinary pressure.

By the term, "extending agent" as used in this disclosure, and in the appended claims, we include any and all of those agents in which the compounds of our invention are dispersed. We include, therefore, the solvents of a true solution, the liquid phase of suspensions, emulsions or aerosols, the semi-solid carrier of ointments and the solid phase of dust and powders.

We have found that the compounds of our invention are active when they are dispersed in an extending agent at concentrations of 0.001 percent by weight or even lower. This concentration is effective when the dispersing agent is a liquid but it is preferred to use more concentrated mixtures when the dispersing agent is a semi-solid or a solid. This is because liquid dispersions which are, of course, suitable for use as sprays give a more intimate contact with the mites than the solid dispersions and, therefore, lower concentrations are more effective with liquid dispersions.

There are a number of solvents which can be utilized for the preparation of solutions, suspensions or emulsions of the compounds of our invention. We have found high boiling oils of vegetable origin such as castor oil or olive oil to be suitable. We have also found low boiling more volatile solvents such as acetone, cyclohexanone, carbon tetrachloride, ethylene dichloride, tetrachloroethane, hydrogenated naphthalenes, alkylated naphthalenes, solvent naphtha and the like to be useful. Petroleum fractions, particularly kerosene, are especially useful. For certain applications it may be advantageous to resort to mixtures of solvents.

If the active agents are to be applied as aerosols it is convenient to dissolve them in a suitable solvent and to disperse the resulting solution in a liquid such as Freon which boils below room temperature. For such applications we have found it is better to employ true solutions of the active agent although it is possible to employ suspensions or emulsions of the active agent.

The agents of this invention are often dispersed either in the form of emulsions or suspensions, in an inert carrier such as water with the aid of a capillary active substance. Such capillary substances may be anion-active, cation-active or non-ionizing. There may be mentioned by way of example natural or synthetic soaps, Turkey-red oil, fatty alcohol sulfonates, esters of fatty acids and the like. Other examples include high molecular weight quaternary ammonium compounds as well as condensation products of ethylene and propylene oxide with monohydric and polyhydric alcohols.

For use as a powder or dust the active ingredients of this invention are mixed with any of a number of extending agents either organic or inorganic in nature which are suitable for the manufacture of pulverulent preparations. This includes, for example, tricalcium phosphate, calcium carbonate, kaolin, bole, kieselguhr, talcum, calcined magnesia, boric acid and others. Materials of vegetable origin such as powdered cork, powdered wood and powdered walnut shells are also useful. These mixtures may be used in the dry form or, by the addition of wetting agents, the dry powder can be rendered wettable by water so as to obtain stable aqueous dispersions suitable for use as sprays.

For special purposes the agents of this invention can be worked into the form of a paste or an ointment by the use of such semi-solid extending agents as soap or Vaseline with or without the aid of solubility promoters and/or dispersing agents.

In all of the forms described above the dispersions may be provided ready for use or they may be provided in a concentrated form suitable for mixing with other extending agents before use.

In all of these various dispersions the active pesticidal agents can be one of or a plurality of the compounds of our invention. The compounds may also be advantageously employed in combination with other pesticides including for example, insecticides, fungicides and bacteriacides. There may be mentioned by way of example, 1,1-bis-(p-chlorophenyl)-2,2,2-trichloroethane (DDT); the gamma isomer of benzene hexachloride; 2,2-dis-(p-methoxy phenyl)-1,1,1-trichloroethane (DMDT); or inorganic compounds such as salts of mercury, copper or arsenic; as well as finely divided sulphur. In this manner it is possible to obtain mixtures which are effective against a wide variety of pests.

The following examples are given by way of illustration only and are not to be construed as limitations of this invention, many variations of which are possible without departing from the spirit or scope thereof.

EXAMPLE I

A mixture containing fifteen mgm. of 1,2-dicarbomethoxy - 3 - [S-(O,O-diethyl)]-propane dithiophosphate, one hundred grams of pulverized calcium carbonate, two grams of olein and one gram of slaked lime is ground in a ball mill. The resulting powder is easily scattered, has good adhesive power and is effective against mites.

EXAMPLE II

A mixture of fifteen mgm. of 1,2-di-n-carbobutoxy-3-[S-(O,O-diethyl)]-propane dithiophosphate, twenty-five g. of talcum, four g. of sodium dibutyl-naphthalene sulfonate, four g. of casein and five g. of sodium carbonate are ground in a ball mill. The mixture is added to an equal quantity of ground calcium carbonate and the whole thoroughly mixed. This powder may be suspended in water immediately before use and gives a miticidal suspension which is sufficiently stable for use in spraying applications.

EXAMPLE III

A solution is prepared containing ten mgm. of 1,2-dicarbomethoxy-3-[S-(O,O-dimethyl)]-propane dithiophosphate in one hundred g. of carbon tetrachloride. The solution is useful as an insecticide in spraying applications.

EXAMPLE IV

A mixture is prepared containing 20 mgm. of 1,2-di-n-carbobutoxy - 3 - [S - (O,O-diethyl)]-propane dithiophosphate; twenty g. of xylene and eighty g. of Turkey-red oil. This solution can be readily emulsified in water and the pesticidal emulsion is suitable as a spray.

EXAMPLE V

A suspension of one hundred g. of finely powdered calcium carbonate in an acetone solution containing fifteen mgm. of 1,2-dicarbomethoxy-3-[S-O,O-di-n-propyl)]-propane dithiophosphate is prepared and the acetone evaporated in vacuo. The resulting powder is easily scattered and is effective against mites.

EXAMPLE VI

A solution is prepared containing twenty mgm. of 1,2-dicarbomethoxy - 3 - [S-(O,O-dimethyl)]-propane dithiophosphate and five g. of DDT in ninety g. of kerosene. This solution is useful as a spray.

EXAMPLE VII

A solution containing forty mgm. of 1,2-dicarbomethoxy - 3 - [S-(O,O-di-n-propyl)]-propane dithiophosphate, forty mgm. of acetone and one hundred and sixty g. of Freon is prepared and used as a pesticidal agent in an aerosol bomb.

EXAMPLE VIII

*1,2-dicarbomethoxy-3-[S-(O,O-dimethyl)]-propane dithiophosphate*

A well stirred suspension of finely ground phosphorous pentasulfide (222.3 g.) in 300 ml. of benzene is heated to reflux under nitrogen and 128 g. of absolute methanol is added dropwise. The addition is carried out over a period of two hours and upon completion the dark brown reaction mixture is heated under reflux for one hour. During this period the amount of solid phosphorous pentasulfide decreased and after filtration 10.6 g. of phosphorous pentasulfide is recovered.

The filtered dark brown reaction mixture which contains dimethyl dithiophosphoric acid is placed in a one liter, three necked, round bottom flask, fitted with a mechanical stirrer, a nitrogen inlet tube and a reflux condenser. To this solution 0.3 g. of hydroquinone, 237 g. of dimethyl itaconate and 2 ml. of triethylamine is added and the resulting mixture stirred and heated under nitrogen at 65° C. for fifteen hours. At the end of this period the reaction mixture is cooled to room temperature transferred to a two liter separatory funnel and extracted with four 50 ml. portions of ten percent sodium carbonate (until the washings are basic). The organic layer is washed with five 100 ml. quantities of water (until the washings are neutral) and dried over anhydrous magnesium sulfate for twelve hours. The solution is filtered and concentrated in vacuo to obtain 449 g. (94.5 percent) of a red-amber oil $n_D^{23.2}=1.5052$. The infrared spectrum of this material indicates the presence of between ten and fifteen percent of unreacted dimethyl itaconate.

This material may be purified by stripping at 60 to 100° C. at 0.03 mm. of Hg for several hours. The non-volatile material is slightly darker than the original material and has a refractive index of $n_D^{23}=1.5111$.

*Analysis.*—Calculated for $C_9H_{17}O_6PS_2$:

|  | Calculated | Found |
|---|---|---|
| Carbon | 34.35 | 34.57 |
| Hydrogen | 5.41 | 5.54 |
| Oxygen (by difference) | 30.25 | 29.94 |
| Phosphorous | 9.77 | 9.91 |
| Sulphur | 20.22 | 20.04 |

EXAMPLE IX

*1,2-dicarbomethoxy-3-[S-(O,O-dimethyl)]-propane dithiophosphate*

A mixture consisting of 73.67 g. of distilled dimethyl dithiophosphoric acid, 65.88 g. of dimethyl itaconate, 0.20 g. of hydroquinone and one ml. of trimethylamine is allowed to stand at room temperature under nitrogen for forty-eight hours. At the end of this period the pale yellow reaction mixture is dissolved in 500 ml. of benzene and the solution washed successively with one 50 ml. portion of water, five 50 ml. portions of ten percent sodium bicarbonate solution and two 50 ml. portions of water. The organic layer is dried over anhydrous magnesium sulfate, filtered and concentrated in vacuo to give 125 g. (95%) of a pale amber oil whose refractive index is $n_D^{26.5°}=1.5023$.

The material is purified by stripping at 60 to 100° C. at 0.03 mm. of mercury for several hours. The non-volatile material is slightly darker and the refractive index and analyses are the same as in Example VIII.

EXAMPLE X

*1,2-dicarbo-n-butoxy-3-[S-(O,O-di-n-propyl)]-propane dithiophosphate*

A mixture consisting of 0.464 mole of distilled di-n-propyl dithiophosphoric acid, 0.422 mole of di-n-butyl itaconate, 0.20 g. of hydroquinone and one ml. of triethylamine is allowed to stand at room temperature under nitrogen for forty-eight hours. At the end of this period the reaction mixture is dissolved in 500 ml. of benzene and the solution washed successively with one 50 ml. portion of water, five 50 ml. portions of ten percent sodium bicarbonate solution and two 50 ml. portions of water. The organic layer is dried over anhydrous magnesium sulfate, filtered and concentrated in vacuo. The yield is 81.8 percent.

The material is purified by stripping at room temperature at 0.01 mm. of mercury for twelve hours. The refractive index of the purified product is $n_D^{23.7°}=1.4829$.

Analysis.—Calculated for $C_{17}H_{33}O_6PS_2$:

|  | Calculated | Found |
|---|---|---|
| Carbon | 49.93 | 50.15 |
| Hydrogen | 8.17 | 7.90 |
| Oxygen (by difference) | 21.03 | 21.34 |
| Phosphorous | 6.78 | 6.76 |
| Sulphur | 14.04 | 13.85 |

EXAMPLE XI

*1-carbomethoxy-2-carboxy-3-[S-(O,O-dimethyl)]-propane dithiophosphate*

This compound is prepared by reacting dimethyl dithiophosphoric acid with 1-carbomethoxy-2-carboxy-propene-2 using the procedure of Example X.

EXAMPLE XII

*1-carboxy-2-carbo-n-butoxy-3-[S-(O,O-di-n-propyl)]-propane dithiophosphate*

This compound is prepared by reacting di-n-propyl dithiophosphoric acid with 1-carboxy-2-carbon-n-butoxy-propene-2 using the procedure of Example X.

EXAMPLE XIII

*1,2-dicarboxy-3-[S-(O,O-di-isobutyl)]-propane dithiophosphate diamide*

This compound is prepared by reacting di-isobutyl dithiophosphoric acid with 1,2-dicarboxy-propene-2-diamide using the procedure of Example X.

EXAMPLE XIV

*1,2-dicarboxy-3-[S-(O,O-dibenzyl)]-propane-dithiophosphate-1-monoamide*

This compound is prepared by reacting dibenzyl dithiophosphoric acid with 1,2-dicarboxy-propene-2-1-monoamide using the procedure of Example X.

EXAMPLE XV

*1,2-dicarboxy-3-[S-(O,O-diphenyl)]-propane dithiophosphate-2-monoamide*

This compound is prepared by reacting diphenyl dithiophosphoric acid with 1,2-dicarboxy-propene-2-monoamide using the procedure of Example X.

EXAMPLE XVI

*N-decyl-1,2-dicarboxy-3-[S-(O,O-dimethyl)]-propane-dithiophosphate-imide*

This compound is prepared by reacting dimethyl dithiophosphoric acid with N-decyl-1,2-dicarboxy-propene-imide using the procedure of Example X.

EXAMPLE XVII

*1,2-dicarboxy-3-[S-(O,O-diethyl)]-propane dithiophosphate anhydride*

This compound is prepared by reacting diethyl dithiophosphoric acid with 1,2-dicarboxy-propene-2-anhydride using the procedure of Example X.

EXAMPLE XVIII

*The disodium salt of 1,2-dicarboxy-3-[S-(O,O-diethyl)] propane dithiophosphate*

This compound is prepared by heating a mixture of five percent sodium bicarbonate solution and the anhydride of the previous example at 60° C. for four hours. The solution is neutralized with dilute HCl, extracted into chloroform and the chloroform solution dried over anhydrous magnesium sulfate. The drying agent is removed by filtration and the product obtained by in vacuo removal of the solvent.

EXAMPLE XIX

*1,2-dicarboxy-3-[S-(O,O-di-n-propyl)]-propane dithiophosphate*

This compound is prepared by heating a mixture of the product of Example X with five percent hydrochloric acid for four hours. The solution is neutralized with dilute aqueous sodium bicarbonate and the product extracted into benzene. The benzene solution is dried over anhydrous magnesium sulfate and the drying agent removed by filtration. The product is obtained by in vacuo removal of the solvent.

EXAMPLE XX

*The calcium salt of 1,2-dicarboxy-3-[S-(O,O-diethyl)]-propane dithiophosphate*

This compound is prepared by treating a concentrated solution of the product of Example XVIII with a concentrated solution of calcium chloride. It precipitates from solution as it is formed.

EXAMPLE XXI

*1,2-dicarbomethoxy-3-[S-(O,O-di-n-butyl)]-propane dithiophosphate*

This compound is prepared in 82% yield using the procedure of Example X. It is a light amber oil with a refractive index of $n_D^{23}=1.4830$.

EXAMPLE XXII

*1,2-dicarbomethoxy-3-[S-(O,O-dimethyl)]-propane dithiophosphate*

This compound is prepared in seventy percent yield using the procedure of Example X. It is a light yellow oil with a refractive index of $n_D^{23.5}=1.4890$.

EXAMPLE XXIII

*1,2-dicarbomethoxy-3-[S-(O,O-dimethyl)]-propane dithiophosphate*

This compound is prepared with seventy-five percent yield using the procedure of Example X. It is a dark amber oil with a refractive index of $n_D^{23.2}=1.4782$.

EXAMPLE XXIV

*1,2-dicarbomethoxy-3-[S-(O,O-diethyl)]-propane dithiophosphate*

This compound is prepared in eighty-two percent yield using the procedure of Example X. It is a light yellow oil with a refractive index of $n_D^{26.5}=1.4938$.

EXAMPLE XXV

*1,2-dicarbophenoxy-3-[S-(O,O-di-n-propyl)]-propane dithiophosphate*

A solution of 42.8 g. (0.2 mole) of distilled di-n-propyl dithiophosphoric acid, 54 g. (0.19 mole) of 1,2-dicarbophenoxy-propene-2, 0.08 g. of hydroquinone and 0.4 ml. of triethylamine in 100 ml. of dry acetone is allowed to stand under nitrogen in a dark flask for seventy-two hours. The acetone is removed in vacuo and the colorless residual oil taken up in 250 ml. of benzene. The benzene solution is washed successively with one 50 ml. portion of water, four 50 ml. portions of ten percent sodium bicarbonate and two 50 ml. portions of water. The solution is dried over anhydrous magnesium sulfate and filtered. The benzene is removed in vacuo and the pale amber viscous oil which remains is stripped at room temperature at 0.01 mm. of mercury for three hours and on a steam bath at the same pressure for four hours. The pale amber oil which remains has a refgractive index of $n_D^{24}=1.5479$ and weighs 80.5 g. (eighty-five percent yield). The material was again stripped at 120° C. and 0.03 mm. of mercury for three hours and the index of refraction changed to $n_D^{24.4°}=1.5495$.

Analysis.—Calculated for $C_{23}H_{29}OPS_2$:

|  | Calculated | Found |
|---|---|---|
| Carbon | 55.63 | 57.45 |
| Hydrogen | 5.89 | 6.09 |
| Oxygen (by difference) | 19.33 | 18.96 |
| Phosphorous | 6.24 | 5.72 |
| Sulphur | 12.91 | 11.98 |

The ineffectiveness of the purification procedure is due to the high boiling point of the main impurity 1,2-dicarbophenoxy-propene-2.

EXAMPLE XXVI

*1,2-dicarbobenzyloxy-3-[S-(O,O-di-n-propyl)]-propane dithiophosphate*

This compound is prepared in eighty-six percent yield using the procedure of Example X. It is a colorless oil with a refractive index of $n_D^{24}=1.5470$.

Analysis.—Calculated for $C_{19}H_{37}O_6PS_2$:

|  | Calculated | Found |
|---|---|---|
| Carbon | 57.23 | 57.44 |
| Hydrogen | 6.34 | 6.23 |
| Oxygen (by difference) | 18.31 | 18.56 |
| Phosphorous | 5.90 | 5.75 |
| Sulphur | 12.22 | 12.02 |

EXAMPLE XXVII

*1,2-dicarbomethoxy-3-[S-(O,O-dibenzyl)]-propane dithiophosphate*

This compound is prepared in eighty-two percent yield using the procedure of Example X. It is a yellow oil with a refractive index of $n_D^{26}=1.5491$.

EXAMPLE XXVIII

*1,2-dicarbophenoxy-3-[S-(O,O-dibenzyl)]-propane dithiophosphate*

This compound is prepared in eighty-one percent yield using the procedure of Example XXV. It is a yellow oil with a refractive index of $n_D^{25}=1.5864$.

EXAMPLE XIX

*1,2-dicarbo-n-butoxy-3-[S-(O,O-di-n-propyl)]-propane dithiophosphate*

A solution of 30 g. (0.14 mole) of distilled di-n-propyl dithiophosphoric acid, 27.7 g. (0.13 mole) of 1,2-dicarbobutoxy-propene-2, 0.01 g. of hydroquinone and 0.2 ml. of triethylamine in 40 ml. of dry benzene is heated under reflux in a nitrogen atmosphere for forty-eight hours. The solution is cooled and the yellow reaction mixture extracted successively with one 30 ml. portion of water, four 30 ml. portions of ten percent sodium bicarbonate and two 30 ml. portions of water. The solution is dried over anhydrous magnesium sulfate and concentrated in vacuo. The resulting pale amber oil is stripped at room temperature at 0.03 mm. of mercury for twelve hours and gives 54.2 g. (seventy-five percent) of an oil whose refractive index is $n_D^{26}=1.4779$.

EXAMPLE XXX

*1,2-dicarbophenoxy-3-[S-(O,O-diphenyl)]-propane dithiophosphate*

This compound is prepared by reacting 1,2-dicarbophenoxy-propene-2 with diphenyl dithiophosphoric acid using the procedure of Example X.

EXAMPLE XXXI

*1,2-dicarboctyloxy-3-[S-(O,O-dimethyl)]-dithiophosphate*

This compound is prepared by reacting 1,2-dicarboheptoxy-propene-2 with dimethyl dithiophosphoric acid using the procedure of Example X.

EXAMPLE XXXII

*1,2-dicarbodecyloxy-3-[S-(O,O-diethyl)]-propane dithiophosphate*

This compound is prepared by reacting 1,2-dicarbodecyloxy-propene-2 with diethyl dithiophosphoric acid using the procedure of Example X.

EXAMPLE XXXIII

*1,2-dicarbomethoxy-3-[S-(O,O-diheptyl)]-propane dithiophosphate*

This compound is prepared by reacting 1,2-dicarbomethoxy-propene-2 with diheptyl dithiophosphoric acid using the procedure of Example X.

EXAMPLE XXIV

*1,2 - dicarboethoxy - 3 - [S - (O,O - dinonyl)] - propane dithiophosphate*

This compound is prepared by reacting 1,2-dicarboethoxy-propene-2 with dinonyl dithiophosphoric acid using the procedure of Example X.

What is claimed is:

1. A 1,2-dicarbalkoxy-3-[S-(O,O-dialkyl)]-propane dithiophosphate wherein the alkyl and alkoxy groups contain from one to four carbon atoms.
2. A 1,2 - dicarbomethoxy - 3 - [S - (O,O - di - n - propyl)]-propane dithiophosphate.
3. 1,2 - dicarbomethoxy - 3 - [S - (O,O - di - isobutyl)]-propane dithiophosphate.
4. 1,2 - dicarbomethoxy - 3 - [S - (O,O - di - n - butyl)-propane dithiophosphate.
5. 1,2 - dicarbomethoxy - 3 - [S - (O,O - diethyl)]-propane dithiophosphate.
6. 1,2 - di - n - carbobutoxy - 3 - [S - (O,O - di - n - propyl)]-propane dithiophosphate.
7. A pesticidal composition containing as its principal active ingredient a compound of claim 1 dispersed in an extending agent.
8. A pesticidal composition containing as its principal active ingredient a compound of claim 1 dispersed in a solid extending agent.
9. A pesticidal composition containing as its principal active ingredient a compound of claim 1 dispersed in a semi-solid extending agent.
10. A pesticidal composition containing as its principal active ingredient a compound of claim 1 dispersed in a liquid extending agent.
11. A method of killing mites which comprises contacting said mites with a 1,2-dicarbalkoxy-3-[S-(O,O-dialkyl)]-propane dithiophosphate.

References Cited in the file of this patent

UNITED STATES PATENTS

| 2,578,652 | Cassaday | Dec. 18, 1951 |
| 2,713,018 | Johnson | July 12, 1955 |

OTHER REFERENCES

Chem. Abstr., vol. 48, 1954, 556i and 557a.
Chem. Abstr., vol. 48, 1954, 6639d.
Agricultural and Food Chemistry, vol. 3, No. 4, pages 315–316, April 1955.
Chem. Abstr., vol. 51, 1957, 15213, citing Novemytermeles, 1955.

UNITED STATES PATENT OFFICE
Certificate of Correction

Patent No. 2,876,156      Abraham Bavley et al.      March 3, 1959

It is hereby certified that error appears in the printed specification of the above numbered patent requiring correction and that the said Letters Patent should read as corrected below.

Column 2, lines 14 to 19, for that portion of the structural formula reading

column 5, line 10, for "2,2-dis-" read —2,2-bis- —; column 7, line 35, for "-carbon-" read — -carbo- —; column 8, lines 51 and 52, should read as shown below instead of as in the patent:

*1,2-dicarbomethoxy-3-[S-(O,O-di-isobutyl)]-propane dithiophosphate* column 10, line 12, for "heptoxy-" read —octyloxy- —.

Signed and sealed this 29th day of September 1959.

[SEAL]

Attest:
KARL H. AXLINE,
*Attesting Officer.*

ROBERT C. WATSON,
*Commissioner of Patents.*